United States Patent

Papenfuhs et al.

[11] 4,097,450
[45] Jun. 27, 1978

[54] PERINONE COMPOUNDS AS COLORANTS FOR POLYOLEFINS

[75] Inventors: Theodor Papenfuhs, Frankfurt am Main; Helmut Tröster, Konigstein, Taunus, both of Germany

[73] Assignee: Hoechst Aktiengesellschaft, Frankfurt am Main, Germany

[21] Appl. No.: 800,895

[22] Filed: May 26, 1977

Related U.S. Application Data

[63] Continuation of Ser. No. 723,072, Sep. 14, 1976, abandoned, which is a continuation of Ser. No. 618,800, Oct. 2, 1975, abandoned.

[51] Int. Cl.$^2$ .............................................. C08K 5/34
[52] U.S. Cl. ................................. 260/42.21; 260/282
[58] Field of Search .......................... 260/282, 42.21

[56] References Cited

U.S. PATENT DOCUMENTS

| 3,415,806 | 12/1968 | Pfister | 260/282 X |
| 3,459,489 | 8/1969 | Sureau et al. | 260/282 X |

FOREIGN PATENT DOCUMENTS

| 2,451,049 | 4/1976 | Germany | 260/282 |
| 316,143 | 8/1930 | United Kingdom | 260/282 |

*Primary Examiner*—Sandra M. Person
*Attorney, Agent, or Firm*—Connolly and Hutz

[57] ABSTRACT

Perinones of the formula

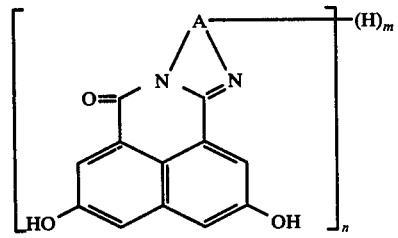

in which A represents an ortho- or peri-arylene radical or a heterocyclic radical, and n represents the number 1 or 2 and $m = 1$ if $n = 1$ and $m = 0$ if $n = 2$, are obtained by reacting a 3,6-dihydroxynaphthalic anhydride with an aromatic or heterocyclic ortho- or peri-diamine or tetramine or the salts thereof. The products are valuable pigments.

2 Claims, No Drawings

PERINONE COMPOUNDS AS COLORANTS FOR POLYOLEFINS

This application is a continuation of application Ser. No. 723,072 filed Sep. 14, 1976 now abandoned which is a continuation of application Ser. No. 618,800 filed Oct. 2, 1975 now abandoned.

We have found novel compounds which correspond to the general formula I

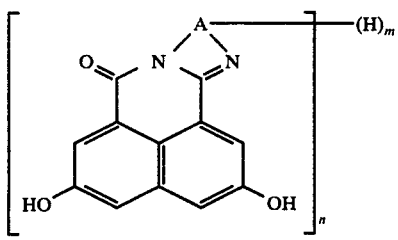

in which A represents an ortho- or peri-arylene radical or a heterocyclic radical, and $n$ represents the number 1 or 2 and $m = 1$ if $n = 1$ and $m = 0$ if $n = 2$.

Of particular interest are compounds of the formula II

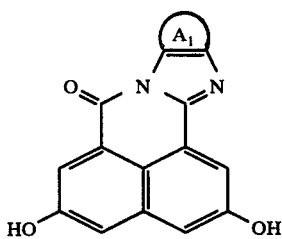

in which $A_1$ represents a mono- or poly-nucleic arylene radical, in particular a phenylene radical which may be substituted by halogen atoms such as fluorine, chlorine or bromine atoms, lower alkyl groups such as methyl, ethyl or propyl groups, lower alkoxy groups such as methoxy, ethoxy or propoxy groups, hydroxy or aryloxy groups, e.g. phenoxy groups which may be substituted, aralkoxy groups such as benzyloxy groups, acylamino groups such as acetyl or benzoylamino groups, lower alkyl-sulfonyl groups, nitro, nitrile, trifluoromethyl, aliphatic carboxylic acid ester groups containing 2 to 5 carbon atoms or carboxylic acid amide groups and, optionally substituted sulfonic acid amide groups, as well as compounds of the formula III

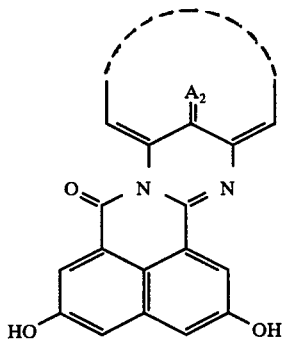

in which $A_2$ represents a naphthalene or acenaphthene radical, which may be substituted by halogen atoms such as fluorine, chlorine or bromine atoms, lower alkyl groups such as methyl or ethyl groups, lower alkoxy groups such as methoxy or ethoxy groups, hydroxy groups or aryloxy groups such as phenoxy groups, nitro groups, acyl groups such as acetyl or benzoyl groups, carboxylic acid amide groups, sulfonic acid amide groups or acylamino groups of an aliphatic or aromatic carboxylic acid, such as acetylamino groups, furthermore compounds of the formula IV

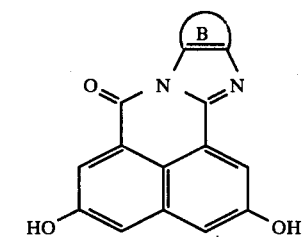

in which B represents a 5- or 6-membered nitrogen-containing hetero-cyclic radical, in particular a diazine radical, and compounds of the formula V

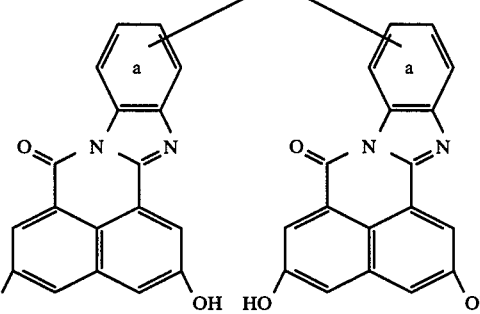

in which X represents a single bond, a straight or branched alkylene radical of 1 to 6 carbon atoms, a vinylene radical or a bridging member of the formula —CO—, —CONH—, —NH—CO—NH—,

—NH—CO—NH—CO—, —CONH—Y—NHCO—, —NHCO—Y—CONH— in which Y is an aliphatic or aromatic radical and the benzene nuclei $a$ may also contain other substituents, and R is hydrogen or lower alkyl.

in which Y is an aliphatic or aromatic radical and the benzene nuclei $a$ may also contain other substituents.

The novel dyestuffs may be obtained by reacting 1 or 2 moles of 3,6-dihydroxynaphthalic acid anhydride with 1 mole of an aromatic or heterocyclic ortho- or peri-diamine or tetramine or the salts thereof, optionally in the presence of acid-binding agents.

The dyestuffs of the formula II may also be obtained by condensing 1 mole of the 3,6-dihydroxynaphthalic acid anhydride with 1 mole of ano-nitroaniline, then reducing the nitro group to an amino group and effecting the cyclization to the dyestuff of the formula II.

The aromatic diamines of the benzene, diphenyl, naphthalene, acenapththene, anthraquinone, flourene or phenanthene series, in particular the ortho-phenylenediamines or ortho- or perinaphthylene-diamines and the o-nitranilines, used as the starting compounds may contain other substituents, for example halogen atoms, such as fluorine, chlorine or bromine atoms, lower alkyl groups such as methyl, ethyl or propyl groups, hydroxy or lower alkoxy groups such as methoxy, ethoxy or propoxy groups, aryloxy groups e.g. optionally substituted phenoxy groups, aralkoxy groups such as benzyloxy groups, acylamino groups such as acetyl or benzoylamino groups, alkyl-sulfonyl groups, nitro, nitrile, trifluoromethyl, carboxylic acid ester groups or carboxylic acid amide groups and optionally substituted sulfonic acid amide groups.

As tetramines, there may be used 1,2,4,5-tetraminobenzene, in particular amines of the formula VI

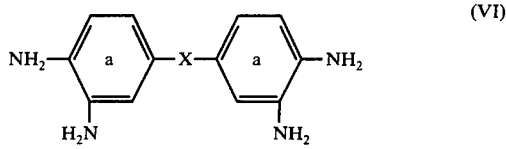

(VI)

in which X has the meanings given above and the benzene nuclei *a* may contain other substituents, for example halogen atoms such as chlorine atoms, lower alkyl groups or lower alkoxy groups.

The 3,6-dihydroxy-1,8-naphthalic acid anhydride used as the starting compound according to the invention may be prepared by sulfonation of 1,8-naphthalic acid anhydride with about 20–30% oleum at 170° - 200° C and by subsequent alkali melt of the 3,6-disulfonaphthalic acid formed (cf. Chemisches Zentralblatt 1936, II, 4213–4214).

The novel dyestuffs are advantageously prepared in known manner by heating the components (3,6-dihydroxy- naphthalic acid anhydride and di- or tetraamine) in water optionally acidified with catalytical amounts of acid or a solvent, for example acetic acid, ethanol, dimethylformamide or N-methylpyrrolidone. The reaction is completed after several hours at elevated temperature, preferably at 80° - 150° C. It may be easily followed by chromatography. In general, the perinone compounds formed of the formula I precipitate from the reaction mixture and are isolated by filtration. The addition of water prior to the isolation may sometimes be of advantage, because some of the compounds of the invention show a tendency to delay crystallization.

In some cases, for example with very unstable aromatic di- or tetra-amines, it may be of advantage to condense, instead of the free base, a mineral acid salt thereof with 3,6-dihydroxynaphthalic acid anhydride, in which case the addition of an acid-binding agent, for example alkali metal carbonate or acetate, warrants a particularly smooth reaction.

In the same manner, a condensation of the 3,6-dihydroxynaphthalic acid anhydride under comparable reaction conditions with the o-nitroaniline from which the unstable diamino compound is derived to the resulting 3,6-dihydroxynaphthalic acid imide may be of advantage, whereupon a reaction of the nitro-group standing in ortho-position to the imide-nitrogen, for example by catalytical or iron reduction is followed and whereupon, in general, the o-amino-group formed spontaneously closes the imidazole ring under separation of water. Heating for several hours to elevated temperatures to effect cyclization has been found necessary only in some cases with kinetically particularly disadvantageous conditions.

The compounds of the invention have been found to be valuable dyes, in particular valuable pigments that may be used in finely dispersed form, individually or as mixtures, for the pigmentation of high molecular organic materials, for example for cellulose ethers and cellulose esters, for example ethyl cellulose, cellulose acetate, cellulose butyrate, for polyamides or polyurethanes or polyesters, natural or synthetic resins such as those resins obtained by polymerization, for example aminoplasts, in particular urea-formaldehyde and melamine-formaldehyde resins, alkyl resins, phenoplasts, polycarbonates, for polyolefins such as polystyrene, polyvinyl chloride, polyethylene, polypropylene, polyacrylonitrile, polyacrylic acid esters, for rubber, casein, silicone and silicon resins.

The compounds isolated according to the invention may have already valuable tinctorial properties. But in many cases, their properties regarding application may often be improved by an usual pigment finish, for example by prolonged heating in water and/or solvents, by distribution by grinding or kneading in the presence of salts, solvents or dispersants.

The high molecular materials to be dyed may be masses of plastic in the form of melts or of spinning solutions, lacquers, dyes or printing inks.

The pigments may be used in the form of a pure pigment powder or in the form of a dispersion of pigment in a resin. The resins which are suitable for use as carriers in pigment dispersions are natural resins, for example abietic acid or the esters thereof, ethyl cellulose, cellulose acetobutyrate, alkaline earth metal salts of higher fatty acids, fatty amines, for example stearyl amine or colophonium-amine, vinyl chloride/vinyl-acetate copolymers, polyacrylonitrile or polyterpene resins or water-soluble resins, for example resins containing sulfonic acid groups or their alkaline earth metal salts.

The next comparable compound of the monohydroxy-naphthoylenebenzimidazole series (known from "Journal of the Society of Dyers and Colourists", Vol. 85 (1969), page 249) is a typical disperse dyestuff and cannot be used as pigment because of its insufficient fastness to bleeding and to over-lacquering.

Thus, it was surprising and not foreseeable that the introduction of an additional hydroxy group would result in such considerable modifications of the properties. In addition to a high tinctorial strength, the novel pigments are distinguished by an excellent fastness to light, very good purity colour shade and, in general, valuable colouristic and utilization properties, in particular by a surprisingly high fastness to solvents and plastizisers, for example a very good fastness to bleeding, overlacquering, migration and blooming. In view of these properties and by reason of their easy accessibility, these compounds represent a considerable technical advance.

The following Examples illustrate the invention, parts are by weight.

EXAMPLE 1

A mixture of 2700 parts of glacial acetic acid, 130 parts of 3,6-dihydroxynaphthalic acid anhydride and 67.3 parts of o-phenylene-diamine was heated, while stirring, for 5 - 6 hours, to the boiling temperature (~115° - 120° C). The reaction mixture was allowed to cool, the dyestuff of the formula

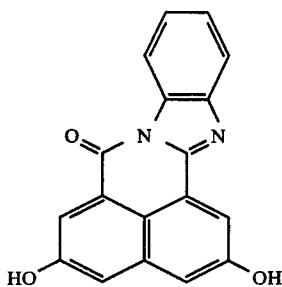

that had precipitated was filtered off with suction, washed with water until neutrality and dried at 80° C. 165 Parts (= 97% of the theory) of a yellow pigment were obtained; the pigment was found to be excellently suitable for the dyeing of synthetics and plastic masses and yielded dyeings with excellent fastness properties.

Better fastness properties, in particular very good fastness to bleeding and overlacquering, were obtained when stirring the water-wet pigment before drying for 5 hours with the 5-fold amount of dimethylformamide at 100° -110° C, filtering it off while hot, washing it with water and drying it.

If, instead of glacial acetic acid, the same quantities of formic acid were used, the pigment was formed with comparable yields and showed the same fastness properties.

EXAMPLE 2

23 Parts of 3,6-dihydroxynaphthalic acid anhydride, 17.4 parts of 1,8-naphthylene-diamine and 5 parts of propionic acid were stirred consecutively into 250 parts of water and the mixture so obtained was heated for 8 hours in an autoclave to 130° - 140° C, whereupon a pressure of 3 - 4 atmospheres rose up. The mixture was then cooled, the pressure was released and the compound formed of the formula

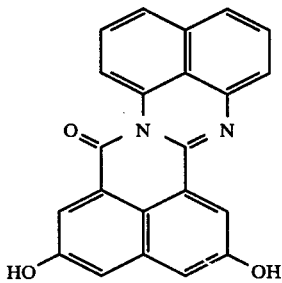

was filtered off with suction, washed with water and dried at 100° C. 35 Parts (= 99% of the theory) of a red pigment were obtained, which pigment was found to be excellently suitable for the preparation of printing inks, lacquers and paints and permits, in these fields of application, dyeings with high colour intensity and excellent properties of fastness.

When the 1,8-naphthylene-diamine was replaced by a corresponding amount of 4-methoxy-1,8-naphthylene-diamine, there was obtained a somewhat more bluish pigment having comparable properties of fastness and higher tinctorial strength.

EXAMPLE 3

23 Parts of 3,6-dihydroxynaphthalic acid anhydride, 25.3 parts of 2,4-diaminoanisole-dichlorohydrate, 400 parts of isopropanol and 20.5 parts of sodium acetate were heated in an autoclave for 10 hours to 140° - 145° C. After cooling, the pressure was released and the dyestuff obtained was filtered off with suction. After washing with isopropanol and water, the dyestuff was dried at 80° C.

31 Parts (= 93.4% of the theory) of an orange yellow pigment were obtained which was found to be suitable for the preparation of light and weather fast lacquers as well as for the colouring of plastizised polyvinyl chloride. Subsequent heating for 5 hours of the water-wet filter cake with the 10-fold amount of a mixture of 9 parts of water and 1 part of isobutanol to 150° C yielded a pigment which had increased covering power and improved fastness to light and to weather.

EXAMPLE 4

23 Parts of 3,6-dihydroxynaphthalic acid anhydride and 18 parts of 3-nitro-4-aminobenzonitrile were introduced into 400 parts of 95% acetic acid and the mixture was then heated to 90° C. After 2 hours, the nitroimide of the formula

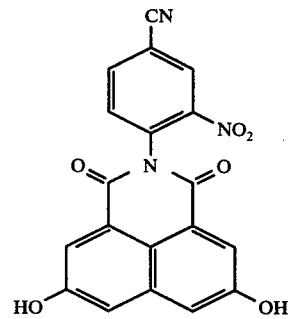

separated. Then, 14 parts of iron powder were added portionwise witin 2 hours. The reaction was exothermic and took place at 100° C. The whole was heated for 3 hours to 100° - 105° C, diluted with 600 parts of water and filtered with suction while hot. The filter cake which was still contaminated with basic iron acetate was then introduced into 1000 parts of dimethylformamide and heated to the boiling temperature. After addition of 5 parts of active carbon, the mixture was filtered with suction through a clarifying filter, the filtrate was cooled to 50° C while stirring and the compound of the formula

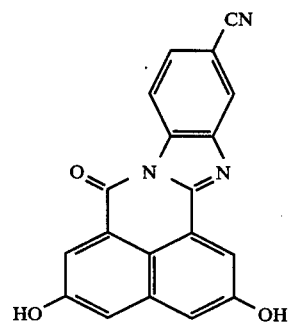

which had precipitated was filtered off, washed with water and dried.

30 Parts of a greenish-yellow pigment (= 91.7% of the theory) were obtaned; the pigment was found to have an excellent fastness to light and to be excellently suitable for the preparation of lacquers, in particular lacquers with metallic effect.

The reduction of the intermediarily formed nitroimide may be effected with the same result catalytically with hydrogen, which also induces spontaneous cyclization to the compound of the invention.

For this purpose, the o-nitroimide isolated by filtration was heated in 1500 parts of dimethylformamide with addition of 1 part of a nickel catalyst and under a hydrogen pressure of 50 atmospheres gauge to 130° C., until no absorption of gas was stated. The pressure was released, the mixture was filtered while hot to remove the catalyst and the filtrate was cooled, while stirring, to 50° C, whereupon the pigment separated. Its isolation was effected as described above.

EXAMPLES 5 – 11

When replacing in Example 4 the 3-nitro-4-aminobenzonitrile by aliquote amounts of other o-nitranilines and working in the manner described, there were obtained other pigments of the invention corresponding to the general formula

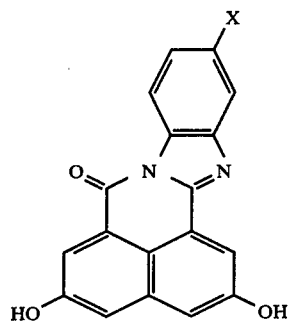

with the yields and shades indicated in table 1.

Table 1

| Example | X | Yield | Shade |
| --- | --- | --- | --- |
| 5 | Cl | 96.3 % | greenish yellow |
| 6 | —OC$_2$H$_5$ | 97.5 % | orange |
| 7 | —NHCOCH$_3$ | 98.5 % | orange red |
| 8 | CH$_3$ | 94.8 % | yellow |
| 9 | Br | 98.1 % | greenish yellow |
| 10 | —SO$_2$CH$_3$ | 96.5 % | greenish yellow |
| 11 | OH | 93.0 % | reddish yellow |

EXAMPLE 12

23 Parts of 3,6-dihydroxynaphthalic acid anhydride, 18.3 parts of 3,4-diaminobenzoic acid and 150 parts of N-methylpyrrolidone were stirred, 5 parts of formic acid were added and the mixture was heated for 5 hours to 120° – 130° C. The precipitate of the compound of the formula

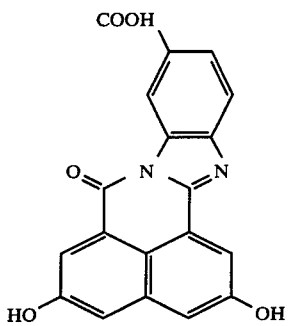

formed was completed by the addition of 200 parts of water, the ocompound was filtered off with suction, washed with water and dried.

33.8 Parts (97.7 % of the theory) of a greenish-yellow pigment were obtained; after grinding with a salt, in particular with the 5-fold amount of sodium sulfate, this pigment was found to be particularly suitable for the preparation of transparent lacquers.

The following Tables 2 to 5 show other compounds of the formulae II to V of the invention which had been prepared according to one of the processes of the invention, in particular in a manner analogous to that described in the foregoing Examples, and indicate also the corresponding yields and shades.

Table 2

| | (Dyestuffs of the formula II) | | |
| --- | --- | --- | --- |
| Example | A$_1$ | Yield | Shade |
| 13 | b CH$_3$— | 96.8 % | yellow |
| 14 | CH$_3$— | 94.8 % | yellow |
| 15 | F— | 91.9 % | greenish yellow |
| 16 | CH$_3$—CH(CH$_3$)— | 89.5 % | reddish yellow |
| 17 | Cl, Cl— | 98.5 % | greenish yellow |
| 18 | H$_7$C$_3$O— | 92.8 % | yellow |
| 19 | (phenoxyphenyl) | 97.0 % | orange |

Table 2-continued (Dyestuffs of the formula II)

| Example | $A_1$ | Yield | Shade |
|---|---|---|---|
| 20 | 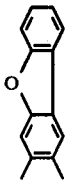 | 98.3 % | reddish yellow |
| 21 | 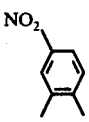 | 98.6 % | greenish yellow |
| 22 | 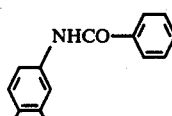 | 98.0 % | orange |
| 23 | 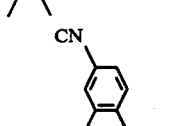 | 94.8 % | greenish yellow |
| 24 | 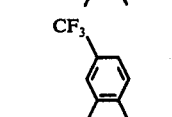 | 91.9 % | greenish yellow |
| 25 | 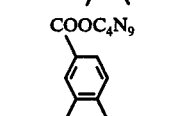 | 89.8 % | greenish yellow |
| 26 | 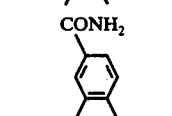 | 99.0 % | greenish yellow |
| 27 | 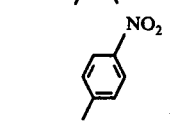 | 97.8 % | greenish yellow |
| 28 | 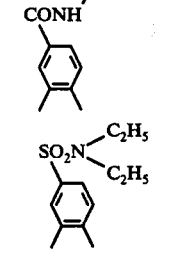 | 96.9 % | greenish yellow |
| 29 |  | 94.5 % | yellow |
| 30 | 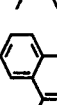 | 92.8 % | yellow |
| 31 | 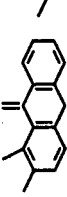 | 98.7 % | red orange |
| 32 | 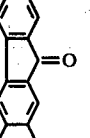 | 93.0 % | yellow |
| 33 | 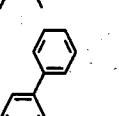 | 94.5 % | yellow |
| 34 | 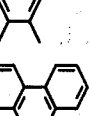 | 94.0 % | yellow |

Table 3

| Example | $A_2$ | Yield | Shade |
|---|---|---|---|
| 35 | 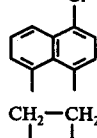 | 96.8 % | bluish red |
| 36 |  | 95.5 % | red |
| 37 | 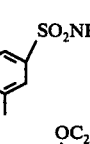 | 99.1 % | bluish red |
| 38 |  | 95.8 % | red |

Table 4

(Dyestuffs of the formula IV)

| Example | B | Yield | Shade |
|---|---|---|---|
| 39 | 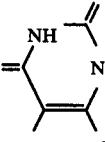 | 95.0 % | yellow |
| 40 | 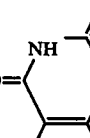 | 94.9 % | yellow |
| 41 | 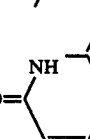 | 98.3 % | yellow |

Table 5

(Dyestuffs of the formula V)

| Ex. | ⟨○⟩—X—⟨○⟩ | Yield | Shade |
|---|---|---|---|
| 42 | (biphenyl, dimethyl) | 97.8 % | yellow |
| 43 | NHCO | 98.9 % | orange |
| 44 | NHCONH | 98.7 % | orange |
| 45 | CO | 94.5 % | greenisch yellow |
| 46 | CH₂ | 97.0 % | yellow |

We claim:

1. In a process wherein a pigment is incorporated into a polyolefin, the improvement consisting essentially of employing as pigment a compound of the formula

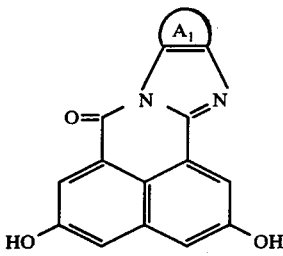

wherein $A_1$ is phenylene which is unsubstituted or substituted by 1 or 2 substituents selected from fluorine, chlorine, bromine, lower alkyl, lower alkoxy, phenyl, phenoxy, hydroxy, benzyloxy, lower alkanoylamino, benzoylamino, lower alkylsulfonyl, nitro, nitrile, trifluoromethyl, carboxy, carbalkoxy of 2 to 5 carbon atoms and carboxylic or sulfonic acid amide which is unsubstituted or substituted at the nitrogen by 1 or 2 radicals selected from lower alkyl, phenyl or nitrophenyl.

2. Process of claim 1 wherein the polyolefin is polypropylene.

* * * * *